April 18, 1944.  W. M. VENABLE  2,346,801
FLUID DOSING DEVICE
Filed June 11, 1942  3 Sheets-Sheet 1
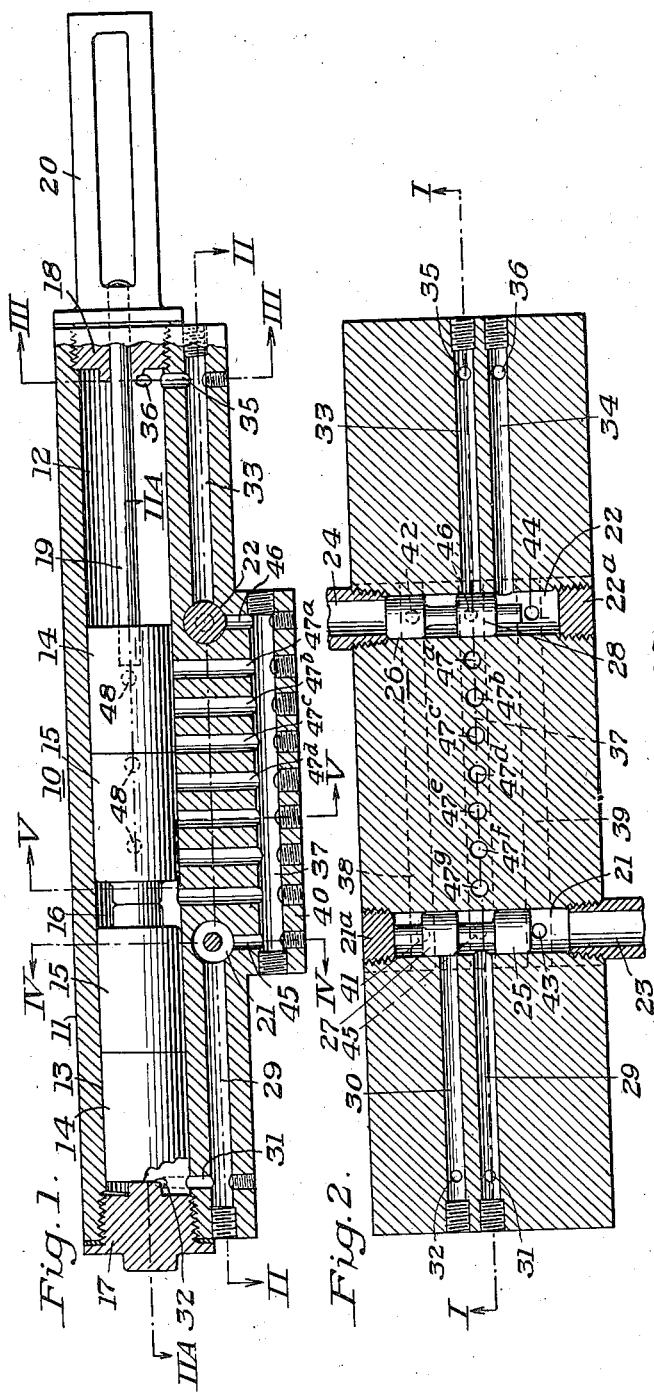
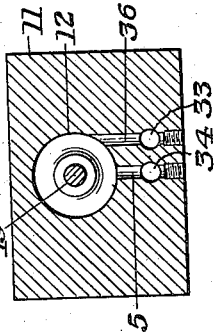
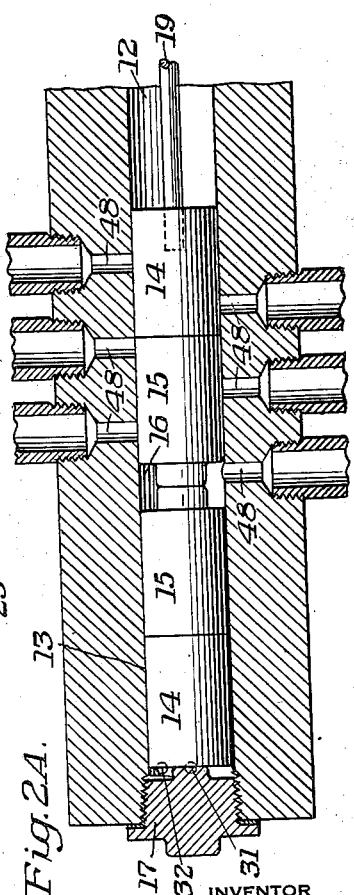
INVENTOR
William M. Venable
by his attorneys
Stebbins and Blenko April 18, 1944.   W. M. VENABLE   2,346,801
FLUID DOSING DEVICE
Filed June 11, 1942   3 Sheets-Sheet 2
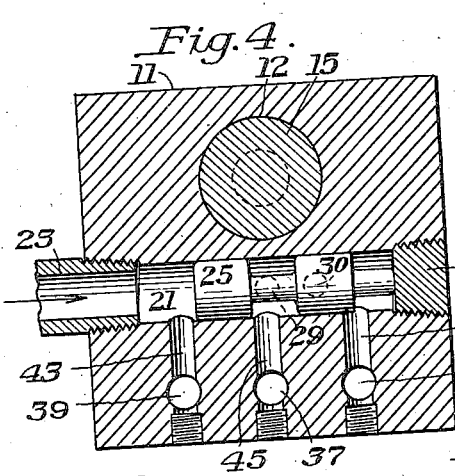
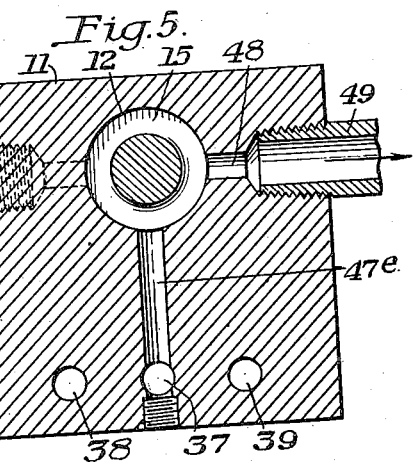

April 18, 1944.  W. M. VENABLE  2,346,801
FLUID DOSING DEVICE
Filed June 11, 1942  3 Sheets-Sheet 3
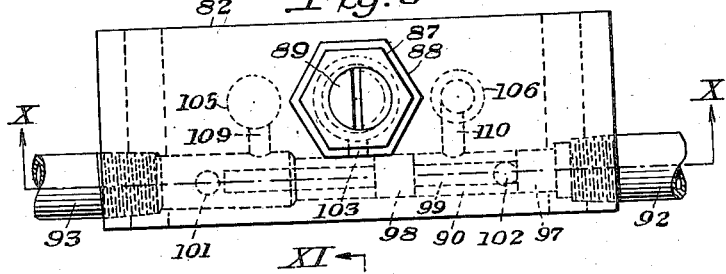
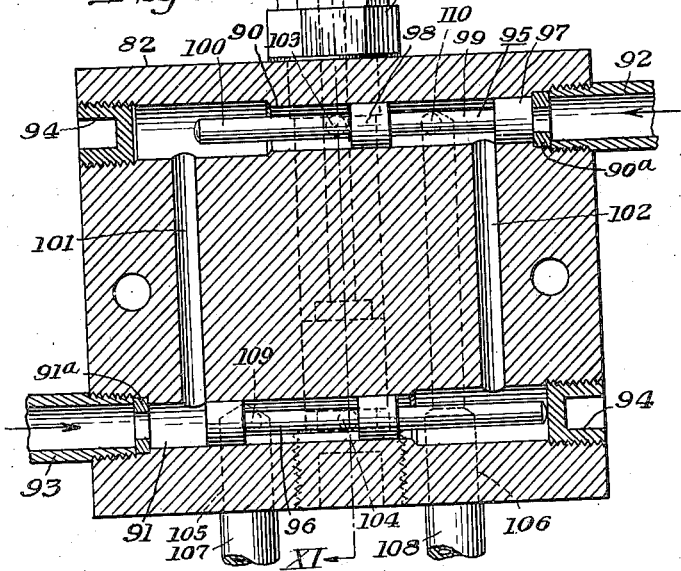
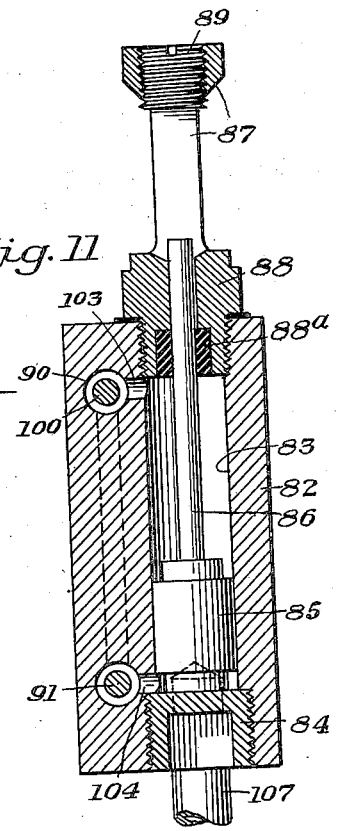
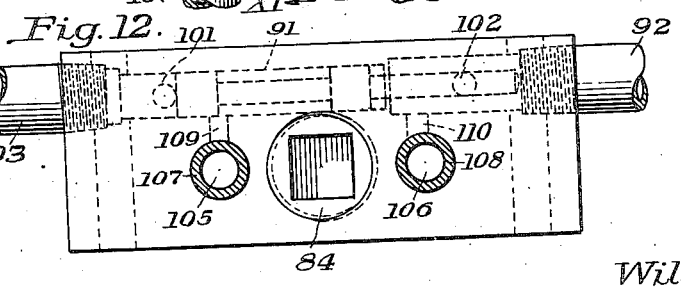
INVENTOR
William M. Venable
by his attorneys
Stebbins and Blenko Patented Apr. 18, 1944

2,346,801

UNITED STATES PATENT OFFICE 2,346,801

FLUID DOSING DEVICE

William Mayo Venable, Pittsburgh, Pa., assignor to Blaw-Knox Company, Pittsburgh, Pa., a corporation of New Jersey Application June 11, 1942, Serial No. 446,569

6 Claims. (Cl. 184—7)

This invention relates to devices for discharging measured amounts of fluid material to different points of delivery. One application of the invention is the supply of fluid lubricant such as grease to a plurality of bearings but the invention also has utility in other fields.

This is in part a continuation of my copending application, Ser. No. 404,477 filed July 29, 1941, for "Fluid dosing device."

Systems for distributing measured amounts of fluid at a plurality of spaced points have been known heretofore, including a plurality of "dosers" connected to points of consumption, a pressure-applying means such as a pump, and a single supply conduit for the dosers (for example, my Patent 2,184,172) or a pair of supply conduits to which the pressure-applying means is connected alternately (for example, Dirkes Patent 1,995,342). It is an object of my invention to improve on known dosers for such systems, particularly in respect to the cost of manufacture, and the assurance of the proper sequence of operations to secure smooth and positive functioning. In particular, it is an object of my invention to provide a dosing device which can be made easily and quickly from a simple starting piece such as a block, by routine machining operations such as drilling.

In a preferred embodiment of the invention, I provide a metal block of suitable material and appropriate size. A hole drilled through the block provides a measuring cylinder in which a floating piston reciprocates. A pair of holes generally at right angles to said cylinder provide cylinders for reciprocating piston valves. Interconnecting passages, inlets and outlets communicating with said measuring and valve cylinders are arranged to cause automatic operation of the floating piston in opposite directions on application of pressure to fluid in the supply conduits successively followed by the release of the pressure. The several cylinders, passages, inlets and outlets may be conveniently formed by drilling into the block normal to the faces thereof and plugging the holes as may be necessary.

In one form of the invention, the doser is adapted to deliver measured charges of fluid to a substantial number of outlets successively in a single stroke of the floating piston. In this embodiment, I provide the measuring cylinder with a plurality of outlet passages spaced therealong and the floating piston reciprocable in the cylinder with an annular groove adapted to place each of the passages successively in communication with a charge of fluid ahead of the piston, during a predetermined portion of the travel of the piston. Movement of the piston is effected by delivering fluid under pressure behind it.

Two species of this embodiment are shown, in one of which the piston in the measuring cylinder is moved alternately in one direction and the other by fluid pressure only, and in the other species the piston in the measuring cylinder is moved in one direction only by fluid pressure and in the opposite direction by a spring, when the fluid pressure is sufficiently reduced.

In the first-mentioned species flow of fluid from the measuring cylinder and the supply of fluid thereto are governed by two control valves of the piston type in much the same manner as disclosed in my Patent 2,341,249 granted on a copending application but with this difference in said copending application, the valve cylinders are parallel with the measuring cylinder, being bored from the same face of the block, while in the first mentioned species disclosed herein the valve cylinders are bored from a face or faces of the block in general at right angles to that from which the measuring cylinder is bored.

In this first species each of the two valves consists of a bore, preferably cylindrical, with several ports entering its wall, and a piston or pistons with close fitting heads sliding therein. These bores will be referred to as valve cylinders. They are parallel with one another, and in general at right angles to the direction of the axis of the measuring cylinder. The valve pistons are reciprocated within the valve cylinders by supplying and releasing pressure, alternately, from two different supply lines, as will be more fully described hereafter. The advantage of having the valve cylinders at right angles to the general direction of the axis of the measuring cylinder in this species will be apparent when this species is described in detail.

In another form of the invention, the full charge displaced by a single stroke of the piston is delivered to one of only two outlets. Usually the dosers will be scattered in various locations adjacent the points of consumption, each doser supplying one point on each piston stroke, or to points alternately.

Further details, novel features and advantages of the invention will become apparent during the following complete description and explanation thereof referring to the accompanying drawings illustrating the embodiments outlined above.

In the drawings,

Figure 1 is a longitudinal central section through one embodiment, with parts in elevation;

Figure 2 is a longitudinal section taken substantially along the plane of line II—II of Figure 1; line I—I of Figure 2 illustrates the plane on which the section of Figure 1 is taken;

Figure 2A is a partial section taken along the plane of line IIa—IIa of Figure 1;

Figures 3, 4 and 5 are transverse sections taken respectively along the plane of lines III—III, IV—IV and V—V of Figure 1;

Figure 6 is a side elevation of a modified form of dosing device with parts in section;

Figure 7 is a longitudinal section through the measuring cylinder of the device shown in Figure 6, but off-set therefrom outside said cylinder to pass through four outlets thereof, two on each of the opposite sides, the plane of section being indicated by line VII—VII of Figure 6;

Figure 8 is a side elevation of the discharge piston for the modified form of dosing device;

Figure 9 is a plan view of a further embodiment of the invention;

Figure 10 is a section therethrough on the plane of line X—X of Figure 9;

Figure 11 is a section taken along the plane of line XI—XI of Figure 10;

Figure 12 is a bottom plan view with parts in section.

Referring now in detail to the drawings and, for the present, to Figures 1 through 5, the preferred embodiment indicated generally at 10 comprises a block 11 of metal or other suitable material bored longitudinally to provide a measuring cylinder 12. A piston 13 is reciprocable in the cylinder 12 and is composed of sections 14 and 15. This piston may be made in a single piece, but it is preferred to make it in several pieces (four being shown) because by so doing it will be less likely to bind in cylinder 12 because of its length, in case 12 is not perfectly straight, and therefore closer fits are possible without extreme precision in the machining of parts. An annular groove 16 is formed in the piston 13 adjacent the middle thereof.

The ends of the cylinder 12 are closed by plugs 17 and 18, the latter having a hole therethrough admitting an indicator stem 19 extending axially from the cylinder. A cage 20 is formed on the plug 18 to protect the stem 19 when extended.

The block 11 is bored transversely to provide valve cylinders 21 and 22. Inlet pipe connections 23 and 24 are threaded into opposite ends of the cylinders and the other ends thereof are closed by screw plugs 21a and 22a. Piston valves 25 and 26 are reciprocable in the cylinders 21 and 22. A piston with two heads, 25 and 27, and a circumferential groove therebetween, is reciprocable in valve cylinder 21 and a similar piston with two heads 26 and 28 in valve cylinder 22. Each piston may be made in the form of a single piece, or of two abutting pieces, as desired. The pistons have stems projecting beyond heads 27 and 28 to provide stops adapted to engage the plugs 21a and 21b respectively, so as to limit the motion of the heads.

The drawings show the valve pistons as consisting of a stem with two heads. These may be made in two parts, if desired, as in operation there never is tension in the stem between them. By doing this slightly less precision is required in boring the valve cylinders, to prevent binding.

Spaced parallel longitudinal passages 29 and 30 communicate with the valve cylinder 21. Cross passages 31 and 32 communicate with the passages 29 and 30 respectively, and the cylinder 12 adjacent one end thereof. A connection is thus provided between one end of cylinder 12 and the valve cylinder 21. While two longitudinal and cross passages make up the connection, this is merely for convenience in manufacture since the two parallel passages function alternately, and a single passage of proper size would serve equally well. Similarly, longitudinal passages 33 and 34 communicate with the valve cylinder 22 and cross passages 35 and 36 communicate with the passages 33 and 34 respectively and the cylinder 12 near the other end.

Three passages, 37, 38 and 39, are drilled parallel to one another longitudinally through an off-set portion 40 of the block, as shown in section in Figure 4. By holes 41 and 42, drilled at right angles to a face of the block, at one end of each, the cylinders 21 and 22 connect with passage 38; by holes 43 and 44 the other ends of cylinders 21 and 22 communicate with passage 39; by holes 45 and 46 the middle portions of cylinders 21 and 22 communicate with passage 37. The ends of passages 37, 38 and 39 are plugged. A plurality of passages 47a, 47b, 47c, etc., intersect the passage 37 and the cylinder 12 at points spaced therealong. These passages are utilized merely as a convenient method of manufacture but, since the only purpose thereof is to provide communication between the passage 37 and the cylinder 12, they could be replaced by a single such passage and a longitudinal groove in the wall of the cylinder 12. The passages 47a, 47b, etc., are spaced apart by a distance less than the width of the groove 16 in the piston 13 so that the latter is always in communication with the passage 37 through one or another of the passages 47a, 47b, etc.

Outlet passages 48 are spaced along the cylinder 12 and are preferably staggered on opposite sides of the cylinder as best shown in Figure 2A. The openings from the cylinder 12 into the passages 48 are all overlapped by the piston 13 or its groove 16 in all positions of the piston. Outlet pipes 49 may be threaded into tapped enlargements of the passages 48 as shown in Figure 5, and extend to the several points to which fluid is to be delivered, only those on the opposite side of the cylinder from the point of view being shown in broken lines in Figure 1. The distance between centers of passages successively communicating with piston groove 16 is equal to the width of the groove as clearly shown in Figure 2A.

It will be apparent that the several cylinders and connecting passages may easily be provided by simple drilling operations on a solid block of metal, at right angles to the faces of the blocks, the drilled passages being plugged on the outside, where necessary, as indicated in the drawings. This feature of the invention makes possible the manufacture of the device at a relatively low cost.

The chief features of the invention thus far described with reference to Figures 1 to 5 are also present in the device shown in Figures 6 to 8, still to be described, and are independent of the means employed for moving the piston lengthwise of the cylinder, which might be done by grease pressure as will be described hereafter, or by hand power as in the ordinary grease gun.

I will describe the operation of the multiple-dose delivering feature before describing the operation of either valve mechanism, to facilitate a clear understanding of this leading feature, using therefor Figure 1, and assuming that the valve pistons 25 and 26 are so positioned as to permit grease from the right-hand end of the cylinder 12 (as shown) to flow freely through passages 35, 33, 46, 37 and 47a, 47b, etc., to the groove 16 in the piston 13.

Movement of the piston 13 toward the right forces grease from the right-hand end of the cylinder 12 through the several passages just enumerated and the groove 16 in the piston, to the outlet passage 48 at the extreme left as shown most clearly in Figure 2A. The amount of grease delivered from the first outlet passage will be equal to the cross-sectional area of cylinder 12 times the distance between consecutive outlet passages 48. As the piston continues to move, similar doses are delivered through the remaining outlet passages successively.

In explaining a complete cycle of operation of the preferred embodiment described above, it will be assumed that the discharge piston and valve pistons are in positions in which they are illustrated and that all the cylinders and passages are full of fluid to be delivered, such as grease.

With the valve pistons in their illustrated positions, the device may be operated by supplying fluid under pressure to the inlet 24. This displaces valve piston 26 downwardly as viewed in Figure 2. This movement of the valve piston forces a small amount of grease through passage 44 into passage 39, and thence into valve cylinder 20 and the other end of supply pipe 23, there being no pressure applied at the pump end of the pipe 23. The movement of piston head 28 also establishes communication between passages 33 and 46 through the valve cylinder 22 and thus permits the discharge of fluid from the right hand end of dosing cylinder 12, as seen in Fig. 1, into the annular space 16. Shifting of the valve piston heads 26 and 28 opens the passage 46 and connects the cylinder end shown at the right in Figure 1 with the passage 37 and the middle portion of cylinder 12. Shifting of valve piston head 26 also opens the passage 42 and permits fluid to flow through passages 38 and 41 into cylinder 21 and to shift the valve piston therein. Movement of valve piston heads 27 and 25 forces some more fluid back into the pipe 23. Movement of piston head 27 past the opening of passage 30 into valve cylinder 21 permits fluid to flow through the passages 30 and 32 into cylinder 12 adjacent plug 17. Movement of valve piston head 27 also interrupts communication between valve cylinder 21 and passage 29.

The entrance of fluid into the cylinder 12 between the plug 17 and the piston 13 displaces the latter to discharge the fluid between the piston and the block 18. This fluid is permitted to flow through the passages 35 and 33 into the valve cylinder 22 between the heads 27 and 28 of the valve piston 26. The fluid is then free to flow through passage 46 into passage 37 and thence through passages 47a, 47b, etc., into the groove 16 in the piston 13, which makes connection with each of the outlet passages 48 in succession.

As the piston 13 moves along the cylinder 12, it remains in communication, for a predetermined time, with each of the outlet passages 48. Since the groove 16 is supplied with fluid under pressure at all times through the passages 47a, 47b, a measured quantity of fluid flows through each outlet passage 48 and connecting pipe 49 during the time it is in communication with the groove. It is thus possible, by a single device, to deliver measured amounts of fluid to a considerable number of points of use.

When the piston 13 has reached the limit of its movement, nothing further happens until fluid under pressure is delivered through the inlet 23 after relief of the pressure on the inlet 24. When this occurs, the valve pistons in cylinders 22 and 21 are displaced successively in the same manner as previously described but in the opposite direction. As a result, fluid flows from inlet 23 through passages 43, 39 and 44 into the valve cylinder 22, thence through passages 34 and 36 into the right hand end of measuring cylinder 12. Leftward movement of the piston 13 then forces fluid through passages 31 and 29 into the valve cylinder 21 between heads 27 and 28 of the valve piston 25, thence through passages 45, 37, 47a, 47b, etc., into the groove 16 in the discharge piston from which it flows successively out of the outlet passages 48 into the pipe connections 49.

The piston valves and connecting passages controlling the supply of fluid to and the discharge of fluid from opposite ends of the measuring cylinder are described and claimed broadly in my copending application, Serial No. 404,476 filed July 29, 1941, for Fluid dosing device, although the exact arrangement of valves shown herein is not described in said application. Specifically, the principal difference is that the valve cylinders 21 and 22 extend transversely of the measuring cylinder 12 instead of parallel thereto as in the copending application. The former arrangement is particularly advantageous because it greatly facilitates drilling operations necessary in the manufacture of the dosing device.

Figures 6 through 8 illustrate a modification of the invention whereby it is adapted for a dosing device of the general type shown in my Patent 2,184,172. This form of the invention includes a block or body 60 bored longitudinally to provide a cylinder 61. The ends of the cylinder are closed by screw plugs 62 and 63. A piston 64 is reciprocable in the cylinder 61 and is normally urged to its uppermost position by a compression spring 65. The spring bears on the screw plug 63 and on a shoulder 66 in a longitudinal bore 67 through the piston. The bore 67 has a portion 68 of reduced diameter in which a valve piston 69 is reciprocable. A screw plug 70 closes the upper end of the bore 68 and a compression spring 71 is disposed therein bearing on the bottom of the valve piston 69 and on a bushing 72 threaded into the bore 68 adjacent the shoulder 66. An inlet pipe connection 73 is threaded into a tapped enlargement of a passage 74 communicating with the cylinder 61. The piston 64 has an annular recess 75 which is in communication with the passage 74 in all positions of the piston. An angular passage 76 connects the recess 75 and the upper end of the bore 68. Another angular passage 77 extends inwardly from the upper end of the piston 64 and into the bore 68 therethrough at a point below the bottom of the valve piston 69 when it is in its uppermost position.

Outlet passages 78 from the bore 61 are spaced therealong preferably in staggered relation on opposite sides and have tapped enlargements to receive delivery pipe connections 79.

An annular groove 80 is formed in the piston 64 and is positioned so that it will come into registry with the passages 78 successively as the piston moves downwardly from its uppermost position. Radial holes 81 drilled through the wall of the piston 64 provide communication between the interior thereof and the groove 80.

In explaining the operation of the modified form of the invention, it will be assumed that the parts are in their illustrated positions and that the entire device is filled with grease or other fluid to be delivered. The device is operated by supplying fluid under pressure through the inlet pipe 73 through the passage 74. The fluid flows through the recess 75 in the piston and the angular passage 76 into the bore 68 above the valve piston 69. The latter is thereupon displaced downwardly compressing the spring 71 and forcing a small amount of fluid through holes 81 into groove 80, the upper outlet 78 and pipe connection 79 to the point of use. When the valve piston 69 clears the lower end of passage 77 fluid is admitted through the latter through cylinder 61 above the piston 64. The piston 64 is thereby forced downwardly.

Downward movement of the piston 64 causes fluid inside the piston and in the lower end of the cylinder 61 to be displaced through holes 81 and the groove 80 into the outlet passages 78 successively. It will be observed that these passages are so positioned that the groove 80 in the piston will be in communication with at least one of the passages at all times. The fluid displaced by the descent of the piston is thus discharged successively to the several points of use through the pipe connections 79a, 79b, 79c, 79d, 79e and 79f.

When the piston 64 has reached the limit of its downward travel and the pressure on the inlet connection 73 is relieved, the spring 71 restores the valve piston 69 to its illustrated position. This provides a by-pass for the fluid between the piston and the screw plug 62 whereupon the spring 65 forces the piston upwardly, thus displacing the fluid thereabove through the passage 77 and into the interior of the piston and the portion of the cylinder 61 therebelow. The device is then ready for a second operation by the application of pressure to the inlet connection 73.

Figures 9 through 12 illustrate a further form of the invention similar to that of Figures 1 through 5 in that it includes a pair of piston valves for causing operation of the main piston solely by hydraulic pressure but differing therefrom in that the device of Figures 9 through 12 is adapted to deliver fluid alternately to one of only two consumption points. In this latter respect, the device of Figures 9 through 12 is generally similar to that disclosed in my copending application, Serial No. 404,476 referred to above. In this form of the invention, a block 82 of suitable metal has a bore therethrough forming a measuring cylinder 83 one end of which is closed by plug 84. A floating piston 85 is reciprocable in the cylinder 83 and has a stem 86 extending axially thereof. A cage 87 has a base 88 threaded into the other end of the cylinder 83, which is drilled to receive the stem 86 and provided with a sealing gland 88a. A plug 89 threaded in the upper end of the cage provides an adjustable stop for engagement by the stem 86 to limit movement of the piston. The stem 86 is visible and acts not only as a stop, but also as an indicator, moving whenever a dose is being delivered.

Valve cylinders 90 and 91 are drilled through the block 82. They are parallel to each other and preferably lie in a plane parallel to the axis of the cylinder 83. In the illustrated embodiment, furthermore, the plane determined by the axes of the valve cylinders is normal to the plane normal to the axis of the measuring cylinder 83. Fluid-supply pipes 92 and 93 are threaded into opposite ends of the valve cylinders and the other ends thereof are closed by plugs 94. Pistons 95 and 96 are reciprocable in the valve cylinders, each including spaced heads 97 and 98 connected by a reduced portion 99, and a stem 100 projecting from one end adapted to engage one of the plugs 94 to limit travel of the pistons in one direction. Movement of the pistons in the other direction is limited by bushings 90a and 91a held in the valve cylinders by the pipes 92 and 93, or by the pipe ends themselves. Since the heads 97 and 98, the only parts of the valves having contact with the valve cylinders, have only a limited travel therein, it is not necessary for the valve cylinders to be accurately finished through their entire length but only in those portions within the range of movement of the heads.

Interconnecting passages 101 and 102 extend between the valve cylinders adjacent the ends thereof. These passages may be formed by drilling from a face of the block 82 and plugging the ends of the holes thus formed.

Passages 103 and 104 extend from opposite ends of the cylinder 83 to the adjacent valve cylinder. These passages, like the interconnecting passages, may be conveniently formed by drilling in from one face of the block and plugging the holes. It will be noted that these passages may be very short.

Outlet passages 105 and 106 are drilled into the block, preferably from the same end thereof although they may equally well be drilled from opposite ends. Pipes 107 and 108 are threaded into the outlet passages and extend to the points to which fluid is to be delivered, i. e., bearings, in the case of a lubricant-distribution system. Passages 109 and 110 drilled normal to the side faces of the block connect the outlet passages 105 and 106 to the valve cylinders 91 and 90, respectively.

The device shown in Figures 9 through 12 functions by the successive application of pressure to the inlets 92 and 93 alternately and the relief thereof. This causes reciprocation of the piston 85 to deliver measured charges of fluid to the outlets 105 and 106 alternately. The operation of the device will now be explained, assuming that the valves and the main piston initially occupy the positions illustrated. They are actuated to these positions by the application of pressure to the fluid in the pipe 93 and it will be further assumed that the operating pressure has been released. A variable residual or back pressure will be maintained in the inlet 93 because of a friction in the supply line, the amount of back pressure depending largely upon the distance between the dosing device and the pump or other pressure-applying means.

To operate the device with the parts in the positions illustrated, pressure is applied to the fluid in the supply line to which inlet pipe 92 is connected. No motion of the piston 99 will occur until the pressure applied at 92 exceeds the back pressure at 93 by an amount sufficient to overcome friction of the two piston heads 97 and 98 in valve cylinder 90 and friction of flow through 101. When that sufficient pressure is attained, however, the piston 99 will move until the stem 100 comes into contact with the plug 94. This motion of the piston 99 with its two heads establishes communication between passages 103 and 110 by way of valve cylinder 90, thus opening a continuous passage for a dose to be delivered from cylinder 83 to outlet passage 106.

Motion of the head 99 past the opening 102 also admits fluid to the valve chamber 91, at the right hand end. Since there is frictional resistance in passage 102, however, the pressure in the right hand end of cylinder 91 will be less than in the right hand end of cylinder 90; and the piston in cylinder 91 will not normally move until that in cylinder 90 has completed its stroke, opening the discharge ports for the dose. But as soon as the piston in cylinder 90 has completed its stroke the piston in cylinder 91 will move, establishing communication between passage 102 and the passage 104 and blocking communication between passage 101 and inlet 93. The motion of the piston in cylinder 91 will force a small additional amount of fluid back into the pipe 93, slightly increasing the back pressure there.

Fluid pressure will then cause the motion of piston 85 and force a dose from cylinder 83 to the outlet pipe 108.

The length of motion of piston 85 and consequently the size of the dose, may be adjusted by means of the plug 89.

When it is assured that all the dosing devices on the same pressure pipe line have operated, it is customary to relieve the pressure at the pump end of the pipe line, so as to reduce leakage; and after a suitable interval of time to apply pressure to the other pipe line, for the purpose of discharging another set of doses. The operation of the device is the same as that just described except that the order in which the operations of the valves take place and the direction of their motion are reversed; and the dose is applied by motion of the piston 85 in the opposite direction.

It will be apparent from the foregoing that the form of the invention shown in Figures 9 through 12 operates automatically in response to the application of pressure to the fluid in the inlets alternately, and the relief thereof, to deliver measured amounts of fluid from the outlets alternately.

It will also be apparent from the foregoing description and explanation that the invention provides a highly effective dosing device capable of delivering measured amounts of fluid to a considerable number of different delivery points, such as bearings or the like. The device in the form illustrated in Figures 6 to 8 is applicable to a system utilizing a single pressure pipe, but may be used on either pipe line of a system utilizing two pressure pipes. As illustrated it contains features in common with my Patent 2,184,172. The device illustrated in Figures 1 to 5 and that illustrated in Figures 9 to 12 are applicable only to two-pipe systems, and contain two valve chambers and pistons which are similar in construction and function to the valve chambers and pistons described and claimed in my copending application, Ser. No. 404,476. In both cases, the structure of the dosing device and its component parts is relatively simple so that manufacturing costs are relatively low. It is obvious that there are advantages in the ability to serve a plurality of delivery points from a single dosing device, as well as in the provision of a plurality of dosing devices, one for each point of delivery.

The embodiment shown in Figures 9 through 12 is characterized by a high degree of simplicity so that it may be manufactured easily and at relatively low cost. All the cylinders, passages and outlets are formed by drilling into the block normal to the faces thereof. The passages connecting the valve cylinders to the measuring cylinder are quite short, providing direct communication with only an insignificant pressure dropped therein. As already pointed out, the portions of the valve cylinders actually traversed by the valve pistons are quite short, thus keeping to a minimum the extent of the cylinder surface required to be accurately finished. All the passages communicating with the measuring cylinder or valve cylinders are short and direct, insuring easy flow of fluid therethrough. The valve ports are opened fully under minimum operating pressure. As a result, only a slight difference between the pressures in the two supply lines is necessary to cause the device to execute a dosing cycle. This is particularly important in installations where long supply lines are involved because it reduces the degree of pressure which it is necessary to apply at the fluid source.

Although I have illustrated and described but a few preferred embodiments of the invention, it will be recognized that changes in the constructions disclosed may be made without departing from the spirit of the invention or the scope of the appended claims.

I claim:

1. In a fluid dosing device, the combination of a cylinder containing the material to be dosed, a series of ports through said cylinder wall at spaced intervals therealong, for delivery of doses, a piston with a circular annular groove slidable in said cylinder, said piston and groove being dimensioned to cover all of said ports in any position which said piston may occupy, said groove being sufficiently wide to extend over at least a part of two ports at a time, passages outside of said cylinder extending from near each end thereof to the middle portion of said cylinder wall and registering with said piston groove in all positions thereof, and valves for establishing and interrupting communication through said passages from either end of said cylinder.

2. In a fluid dosing device, the combination of a cylinder containing the material to be dosed, a series of ports through said cylinder wall at spaced intervals therealong, for delivery of doses, a piston with a circular annular groove slidable in said cylinder, said piston and groove being dimensioned to cover all of said ports in any position which said piston may occupy, said groove being sufficiently wide to extend over at least a part of two ports at a time, and passages outside of said cylinder from near each end thereof to the middle portion of said cylinder registering with said piston groove in all positions thereof, each of said passages including a cylinder having a piston valve reciprocable therein for opening and closing the passage, said piston valve cylinders being parallel to each other, and normal to the axis of said dosing cylinder.

3. In a fluid dosing device, the combination of a cylinder containing the material to be dosed, a series of ports through said cylinder wall at spaced intervals therealong, for delivery of doses, a piston with a circular annular groove slidable in said cylinder, said piston and groove being dimensioned to cover all of said ports in any position which said piston may occupy, said groove being sufficiently wide to extend over at least a part of two ports at a time, passages outside of said cylinder from near each end thereof to the middle portion of said cylinder wall registering with said piston groove in all positions thereof, each of said passages including a valve cylinder and piston valves in said valve cylinders for opening and closing said passages, all of said cylinders and passages being drilled perpendicular to three planes at right angles to one another.

4. In a fluid-dosing device, a block having a bore therein forming a dosing cylinder, a piston reciprocable in said bore, a pair of valve cylinders bored in said block lying in a plane parallel to and spaced from the dosing cylinder, the valve cylinders being at right angles to the dosing cylinder, an inlet near one end of each valve cylinder, a passage from a point near the inlet end of each valve cylinder to a point near the other end of the other valve cylinder, a connection from a point intermediate the ends of each valve cylinder to the adjacent end of the dosing cylinder, each valve cylinder having a port between said passages, a valve piston reciprocable in each valve cylinder having a cut-away portion intermediate its ends, said valve pistons being so dimensioned that when in one extreme position they block communication between one end of one of said passages and the inlet and also between said connection and said port, and when in the other extreme position the valve blocks communication between the end of the other of said passages and said port and said portion overlaps the connection and said port, said valve pistons normally being disposed in opposite extreme positions, each valve piston being movable alternately under the pressure of fluid in the inlet of its valve cylinder, from the first-mentioned position to the second-mentioned position, thereby connecting one end of the dosing cylinder to the port of the cylinder of the actuated valve piston, opening communication between said inlet and said one end of said one of said passages, and admitting fluid therethrough to the other valve cylinder to cause the valve piston therein to move sequentially from the second-mentioned position to the first-mentioned position and admit fluid to the other end of the dosing cylinder, and means extending between the ports in the valve cylinders and the points to which fluid is to be delivered for conveying the fluid from said ports to said points.

5. A dosing device as defined by claim 4 characterized by said cylinders, passages and connections being substantially normal to the faces of the block, respectively.

6. The apparatus defined by claim 4 characterized by outlets each comprising solely a passage bored in said block parallel to said dosing cylinder and at right angles to said valve cylinders and communicating with the port in one valve cylinder.

WILLIAM MAYO VENABLE.